United States Patent
Choi

(10) Patent No.: US 8,851,509 B1
(45) Date of Patent: Oct. 7, 2014

(54) CENTER AIRBAG FOR VEHICLE

(71) Applicant: Hyundai Motor Company, Seoul (KR)

(72) Inventor: Jun Yeol Choi, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/066,513

(22) Filed: Oct. 29, 2013

(30) Foreign Application Priority Data

Jul. 11, 2013 (KR) .................. 10-2013-0081508

(51) Int. Cl.
*B60R 21/214* (2011.01)
*B60R 21/237* (2006.01)
*B60R 21/261* (2011.01)
*B60R 21/217* (2011.01)

(52) U.S. Cl.
CPC ............. *B60R 21/217* (2013.01); *B60R 21/214* (2013.01)
USPC ............... 280/730.1; 280/740; 280/743.1; 493/405

(58) Field of Classification Search
CPC B60R 21/214; B60R 21/232; B60R 21/2346; B60R 21/237; B60R 21/261; B60R 21/262; B60R 2021/23153; B60R 2021/23161; B60R 2021/23192; B60R 2021/237; B60R 2021/26058; B60R 2021/261; B60R 2021/2612; B60R 2021/2617
USPC ........ 280/730.1, 730.2, 736, 740, 742, 743.1; 493/405, 411, 413, 451
See application file for complete search history.

(56) References Cited

U.S. PATENT DOCUMENTS

| | | | | |
|---|---|---|---|---|
| 3,606,377 | A * | 9/1971 | Martin | 80/741 |
| 3,664,682 | A * | 5/1972 | Wycech | 280/730.1 |
| 3,733,088 | A * | 5/1973 | Stephenson | 280/730.1 |
| 5,536,041 | A * | 7/1996 | Acker et al. | 280/740 |
| 6,293,581 | B1 * | 9/2001 | Saita et al. | 280/730.2 |
| 6,460,878 | B2 * | 10/2002 | Eckert et al. | 280/730.1 |
| 6,648,367 | B2 * | 11/2003 | Breed et al. | 280/730.1 |
| 6,739,622 | B2 * | 5/2004 | Halford et al. | 280/743.1 |
| 6,811,184 | B2 * | 11/2004 | Ikeda et al. | 280/742 |
| 6,848,708 | B2 * | 2/2005 | Green et al. | 280/729 |
| 7,004,501 | B2 * | 2/2006 | Schneider et al. | 280/743.1 |
| 7,195,276 | B2 * | 3/2007 | Higuchi | 280/730.1 |
| 7,222,877 | B2 * | 5/2007 | Wipasuramonton et al. | 280/730.1 |
| 7,597,348 | B2 * | 10/2009 | Fukuda et al. | 280/730.2 |
| 7,735,862 | B2 * | 6/2010 | Choi | 280/743.1 |

(Continued)

FOREIGN PATENT DOCUMENTS

| | | | | |
|---|---|---|---|---|
| JP | 10264761 A | * | 10/1998 | B60R 21/22 |
| JP | 2005-132292 A | | 5/2005 | |
| KR | 10-0788189 B1 | | 12/2007 | |
| KR | 10-2013-0031458 A | | 3/2013 | |

*Primary Examiner* — Faye M Fleming
*Assistant Examiner* — Laura Freedman
(74) *Attorney, Agent, or Firm* — Morgan, Lewis & Bockius LLP

(57) ABSTRACT

A center airbag apparatus for a vehicle may include an inflator ejecting gas in an event of a vehicle collision, an airbag housing provided on a roof panel between a front seat and a rear seat, and an airbag cushion coupled at an upper end thereof to the airbag housing and fluid-connected to the inflator, wherein the airbag cushion may be folded in a vertical direction and then folded at both sides thereof towards a middle portion, thus allowing the both sides to be first unfolded and then the airbag cushion to be deployed downwards, when the gas may be ejected from the inflator into the airbag cushion.

7 Claims, 4 Drawing Sheets

(56) References Cited

U.S. PATENT DOCUMENTS

| | | | |
|---|---|---|---|
| 7,926,840 B1 * | 4/2011 | Choi | 280/730.1 |
| 8,002,309 B2 * | 8/2011 | Kim et al. | 280/729 |
| 8,240,706 B2 * | 8/2012 | Bustos Garcia et al. | 280/730.1 |
| 8,393,637 B2 * | 3/2013 | Choi et al. | 280/730.1 |
| 8,398,113 B2 * | 3/2013 | Choi et al. | 280/730.1 |
| 8,403,358 B2 * | 3/2013 | Choi et al. | 280/728.2 |
| 8,573,634 B2 * | 11/2013 | Choi et al. | 280/730.1 |
| 2008/0150263 A1 * | 6/2008 | Mizuno et al. | 280/730.1 |

\* cited by examiner

CENTER AIRBAG FOR VEHICLE

CROSS-REFERENCE TO RELATED APPLICATION

The present application claims priority to Korean Patent Application No. 10-2013-0081508, filed on Jul. 11, 2013, the entire contents of which is incorporated herein for all purposes by this reference.

BACKGROUND OF THE INVENTION

1. Field of the Invention

The present invention relates to a center airbag for a vehicle, which is provided on a roof panel between a front seat and a rear seat so as to protect a passenger sitting in the rear seat in the event of a vehicle collision.

2. Description of Related Art

Generally, a vehicle is equipped with a safety device to safely protect a passenger from an accident, such as a collision or overturning. A safety belt for restraining the body of a passenger and an airbag for relieving shocks generated when a passenger collides with a vehicular body are used as the safety device. The airbag is installed as necessary at various portions of a vehicle, and includes a driver seat airbag that is installed in a steering wheel, and a passenger seat airbag that is installed in an instrument panel of a passenger seat.

As for a common car in FIG. 1, a front space 2 in which a passenger 1 of a front seat is present and a rear space 4 in which a passenger 3 of a rear seat is present are formed into a single integrated space. Due to such a configuration, when a vehicle collision occurs when the passenger 3 of the rear seat does not wear a safety belt, the passenger 3 of the rear seat is moved to the front of the vehicle by inertial force, so that passengers in the vehicle may undesirably collide with each other. In addition, the movement of baggage from the rear seat to the front causes a collision between the passenger and the baggage, thus resulting in serious damage.

In order to solve the problem, a conventional airbag apparatus capable of separating the front space from the rear space has been proposed. However, the conventional airbag apparatus is problematic in that it may be deployed to the front of the vehicle and caught by the front seat, so that the airbag apparatus cannot be deployed completely, or it may be deployed to the rear of the vehicle and caught by the passenger of the rear seat, so that the airbag apparatus cannot be deployed completely.

Moreover, even when the airbag is deployed, it is deployed unstably, thus causing an undesirable movement of the airbag. Therefore, it takes a long time to stabilize the airbag after being fully deployed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a center airbag for a vehicle, which is capable of separating a front space from a rear space and sufficiently protecting a passenger sitting in a rear seat in the event of a vehicle collision.

In an aspect of the present invention, a center airbag apparatus for a vehicle, may include an inflator ejecting gas in an event of a vehicle collision, an airbag housing provided on a roof panel between a front seat and a rear seat, and an airbag cushion coupled at an upper end thereof to the airbag housing and fluid-connected to the inflator, wherein the airbag cushion is folded in a vertical direction and then folded at both sides thereof towards a middle portion, thus allowing the both sides to be first unfolded and then the airbag cushion to be deployed downwards, when the gas is ejected from the inflator into the airbag cushion.

The center airbag apparatus may further include a diffuser provided on an upper end of the airbag cushion along with the inflator, and including at least one vent hole to allow the gas ejected from the inflator to move towards the airbag cushion.

The inflator may include a gas jet hole positioned at a central portion on the upper end of the airbag cushion, wherein the diffuser may include on both side ends thereof vent holes, respectively, to allow the gas ejected from the inflator to move towards the both sides of the airbag cushion.

The inflator may include a first inflator and a second inflator, gas jet holes of the first inflator and the second inflator being disposed to be directed in opposite directions each other, wherein the diffuser may include a first diffuser and a second diffuser disposed at gas-jet-hole sides of the first inflator and the second inflator, thus allowing the gas ejected from the first inflator and the second inflator to move towards the both sides of the airbag cushion.

The vent hole of the first diffuser may include a side vent hole that is open to a first side of the airbag cushion, and a downward vent hole that is open towards a lower portion of the airbag cushion.

The vent hole of the second diffuser may include a side vent hole that is open to a second side of the airbag cushion, and a downward vent hole that is open towards the lower portion of the airbag cushion.

A width of the side vent hole formed in each of the first and second diffusers is larger than that of the downward vent hole formed in each of the first and second diffusers.

The airbag cushion is provided in the airbag housing by rolling the airbag cushion in the state where the both sides thereof folded in a zigzag fashion in the vertical direction are folded towards the middle portion.

As is apparent from the above description, the center airbag for the vehicle is advantageous in that the cushion can be rapidly deployed downwards between the front seat and the rear seat in the event of the vehicle collision, and the cushion is prevented from being caught by the back of the front seat or the passenger of the rear seat due to the deployment of the cushion towards the front seat or the rear seat, thus protecting the passenger sitting in the rear seat and preventing the dangerous throwing of baggage from the rear seat.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
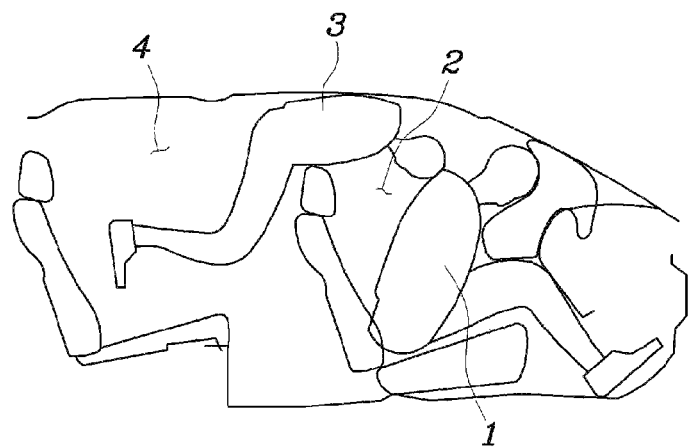
FIG. 1 is a view showing an internal structure of a conventional vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the center airbag for the vehicle according to preferred embodiments of the present invention will be described with reference to the accompanying drawings.

Figure 2:
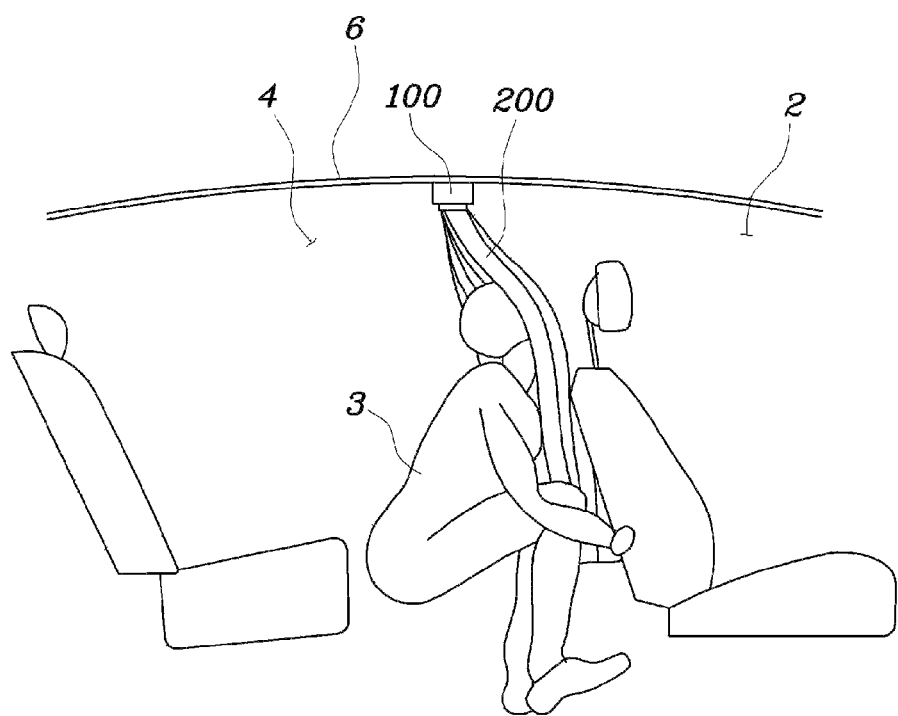
FIG. 2 is a view showing a center airbag for a vehicle according to an exemplary embodiment of the present invention.
Figure 3:
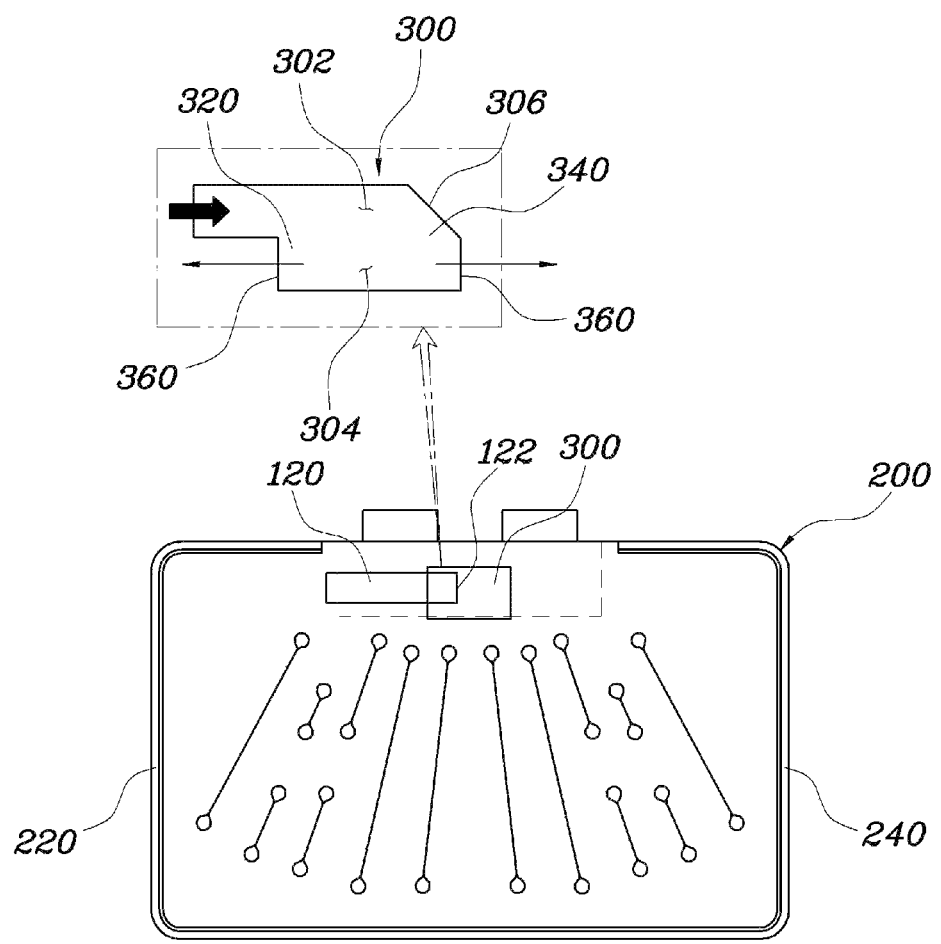
FIG. 3 is a view showing a center airbag for a vehicle according to various exemplary embodiments of the present invention.
Figure 4:
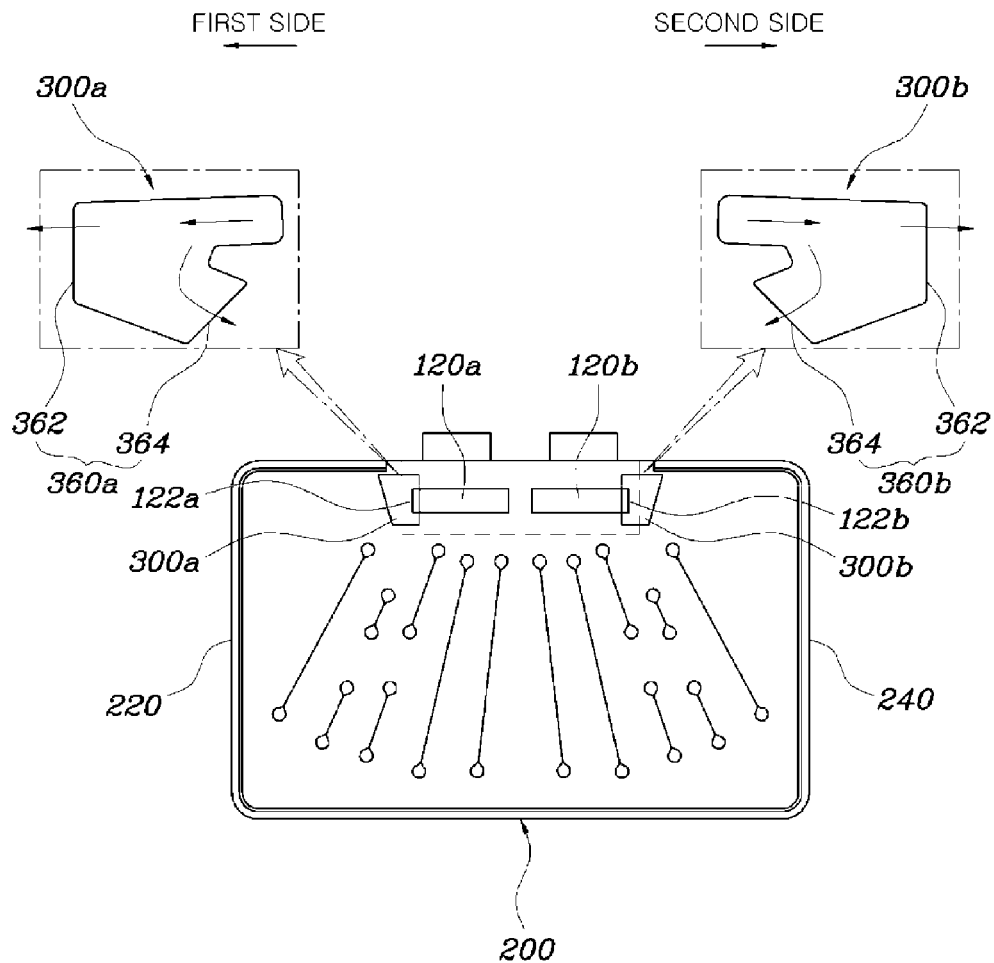
FIG. 4 is a view showing a center airbag for a vehicle according to various exemplary embodiments of the present invention.

FIG. 2 is a view showing a center airbag for a vehicle according to an exemplary embodiment of the present invention, FIG. 3 is a view showing a center airbag for a vehicle according to a first embodiment of the present invention, and FIG. 4 is a view showing a center airbag for a vehicle according to a second embodiment of the present invention.

Referring to FIGS. 2 and 3, the center airbag for the vehicle according to an exemplary embodiment of the present invention includes an airbag housing 100 that is provided on a roof panel 6 between a front seat 2 and a rear seat 4 and includes an inflator 120 to eject airbag gas in the event of a vehicle collision, and an airbag cushion 200 that is coupled at an upper end thereof to the airbag housing 100 and is folded several times in a vertical direction and then folded at both sides 220 and 240 thereof towards a middle portion, thus allowing the both sides 220 and 240 to be first unfolded and then the airbag cushion 200 to be deployed downwards when gas is ejected from the inflator 120.

The airbag housing 100 of the present invention is provided on the roof panel 6 between the front seat 2 and the rear seat 4, and extends in a transverse direction from the left to the right of a vehicular body, with the inflator 120 provided in the airbag housing 100. According to an exemplary embodiment of the present invention, one or more inflators 120 may be installed. The specific configuration of the present invention corresponding to the installed number of inflators 120 will be described below together with the diffuser 300.

On one hand, the airbag cushion 200 is configured such that its upper end is coupled to the airbag housing 100, it is folded several times in the vertical direction and then both sides are folded towards the middle portion.

When the airbag is mounted to the roof panel 6, the portion enabling the airbag to be mounted is limited because of the structure of a vehicle roof. That is, the transverse width of the airbag installed between the front seat 2 and the rear seat 4 of the vehicle should be equal to the transverse width in the vehicle so as to prevent baggage or a passenger in the rear seat 4 from being thrown to the front of the vehicle. Hence, the width of the airbag cushion 200 is larger than that of the airbag housing 100, so that, when airbag cushion 200 is accommodated in the airbag housing 100, the both sides 220 and 240 should be folded.

In this respect, when it is required to fold the airbag cushion 200, when the both sides 220 and 240 are first folded and then the airbag cushion 200 is accommodated in the airbag housing 100, the lower end of the folded airbag cushion 200 is pushed out because the both sides 220 and 240 are intended to be unfolded first while the airbag cushion 200 is being deployed. Consequently, abnormal deployment may take place.

In order to solve the problem, according to an exemplary embodiment of the present invention, after the airbag cushion 200 is folded in the vertical direction, the both sides 220 and 240 are folded towards the middle portion. Thereby, when gas is ejected from the inflator 120, the both sides 220 and 240 of the airbag cushion 200 are first unfolded and then the airbag cushion 200 is sequentially deployed downwards. Therefore, it is possible to induce smooth deployment of the airbag cushion 200 and to guarantee normal deployment.

The present invention will be described below in detail. The center airbag may further include a diffuser 300 on an upper end of the airbag cushion 200 along with the inflator 120. The diffuser 300 includes one or more vent holes 360 to allow the gas ejected from the inflator 120 to move towards the airbag cushion 200.

The diffuser 300 serves to render gas ejected from the inflator 120 to move to the both sides 220 and 240 of the airbag cushion 200, and is provided on the upper end of the airbag cushion 200 along with the inflator 120. A vent hole 360 is formed in the diffuser 300. The vent hole 360 enables the gas ejected from the inflator 120 to move to the both sides 220 and 240 of the airbag cushion 200.

The above diffuser 300 will be described below in detail, together with the installation of the inflator 120.

As the first embodiment of the present invention, as shown in FIG. 3, the inflator 120 is provided in such a way that a gas jet hole 122 is positioned at a central portion on the upper end of the airbag cushion 200, and the diffuser 300 includes on both side ends 320 and 340 thereof vent holes 360, respectively, to allow the gas ejected from the inflator 120 to move towards the both sides 220 and 240 of the airbag cushion 200.

Such a configuration is suitable for a small vehicle having a small area in need of protection. As the area to be protected becomes small, the area of the airbag cushion 200 is also reduced. Thus, the airbag cushion 200 can be sufficiently deployed with one inflator 120.

In this respect, the inflator 120 is preferably provided in such a way that the gas jet hole 122 is positioned at the central portion on the upper end of the airbag cushion 200, thus allowing gas ejected from the inflator 120 to be uniformly supplied to the both sides 220 and 240 of the airbag cushion 200. The diffuser 300 is installed around a gas inlet hole of the inflator 120, and the vent holes 360 are formed in the both side ends 320 and 340, respectively, thus causing gas ejected from the inflator 120 to move towards the both sides 220 and 240 of the airbag cushion 200.

Referring to FIG. 3, the diffuser 300 is divided into an upper space 302 to which the gas jet hole 122 of the inflator 120 is connected, and a lower space 304 that has vent holes 360 at both ends 320 and 340. In this respect, the upper space 302 of the diffuser 300 is formed such that a portion thereof opposite to the inflator 120 is inclined in a diagonal line. Thereby, gas ejected from the inflator 120 flows along the inclined portion 306 to the lower space 304.

Further, the upper space 302 of the diffuser 300 is formed to extend in the transverse direction, and the upper space 302 is supported by a housing frame for mounting the airbag housing 100 to the roof panel 6 of the vehicle, thus allowing gas ejected radially from the inflator 120 to be reflected by the housing frame and be moved to the lower space 304.

Thereby, in the event of a vehicle collision, gas ejected from the inflator 120 can rapidly pass through the diffuser 300 to the airbag cushion 200. As a result, the speed of deploying the airbag cushion 200 can be increased.

Further, according to the second embodiment of the present invention, as shown in FIG. 4, the inflator 120 includes a first inflator 120a and a second inflator 120b, the first inflator 120a and the second inflator 120b being disposed such that gas jet holes 122a and 122b thereof are directed in opposite directions, and the diffuser 300 includes a first diffuser 300a and a second diffuser 300b at gas-jet-hole sides of the first inflator 120a and the second inflator 120b, thus allowing gas ejected from the first inflator 120a and the second inflator 120b to move towards the both sides 220 and 240 of the airbag cushion 200.

Such a configuration is suitable for mid-size and full-size vehicles each having a large area in need of protection. As the area to be protected becomes large, the area of the airbag cushion 200 is also increased. Thus, it may be difficult to satisfy the speed of deploying the airbag cushion 200 with only one inflator 120.

Therefore, in order to satisfy the deploying speed of the airbag installed in the midsize or full size vehicle, the inflator 120 may include the first inflator 120a and the second inflator 120b.

In this respect, the first inflator 120a and the second inflator 120b are provided on the upper end of the airbag cushion 200 in such a way that the gas jet hole 122a of the first inflator 120a is directed towards a first side and the gas jet hole 122b of the second inflator 120b is directed towards a second side. As such, since the gas jet holes 122a and 122b are directed in opposite directions, gas ejected from the respective inflators 120a and 120b can be supplied to the both sides 220 and 240 of the airbag cushion 200. Preferably, the gas volume and ejection time of the first inflator 120a are equal to those of the second inflator 120b, thus allowing the same amount of gas to be discharged to the both sides 220 and 240 of the airbag cushion 200.

The first diffuser 300a and the second diffuser 300b are provided, respectively, in the gas jet holes 122a and 122b of the first and second inflators 120a and 120b.

In this respect, the vent hole 360a of the first diffuser 300a includes a side vent hole 362 that is open to a first side of the airbag cushion 200, and a downward vent hole 364 that is open towards a lower portion of the airbag cushion 200. The vent hole 360b of the second diffuser 300b includes a side vent hole 362 that is open to a second side of the airbag cushion 200, and a downward vent hole 364 that is open towards the lower portion of the airbag cushion 200.

In this respect, since the side vent hole 362 and the downward vent hole 364 formed in the vent holes 360a and 360b of the first and second diffusers 300a and 300b have the same function and operation except for a facing direction, the same reference numerals are used.

According to an exemplary embodiment of the present invention, after the both sides 220 and 240 of the airbag cushion 200 are first unfolded, the airbag cushion 200 should be deployed downwards. Thus, the side vent holes 362 that are open towards opposite sides are formed in the first diffuser 300a and the second diffuser 300b, thus allowing gas ejected from the respective inflators 120a and 120b to move to the both sides 220 and 240 of the airbag cushion 200.

In this respect, the side vent hole 362 of each of the first and second diffusers 300a and 300b may be inclined at a predetermined angle to adjust the gas ejection direction. That is, the side vent hole 362 is inclined in a diagonal line from an upper position to a lower position towards the center of the cushion, thus allowing gas passing through the side vent hole 362 to move to the both sides 220 and 240 and the lower portion of the airbag cushion 200.

Each of the first and second diffusers 300a and 300b has a downward vent hole 364 as well as a side vent hole 362. Such a downward vent hole 340 allows some of the gas ejected from the inflator 120 to move to the lower portion of the airbag cushion 200, thus enabling the airbag cushion 200 to be deployed laterally and downwards almost simultaneously.

To be more specific, the width of the side vent hole 362 formed in each of the first and second diffusers 300a and 300b is preferably larger than that of the downward vent hole 364 formed in each of the first and second diffusers 300a and 300b.

The airbag cushion 200 of the present invention should be deployed after the both sides 220 and 240 are first deployed. Thus, gas of the inflator 120 should be first moved towards the both sides 220 and 240 of the airbag cushion 200. In addition, since the airbag cushion 200 should be rapidly deployed downwards after the both sides 220 and 240 thereof are unfolded, each of the first and second diffusers 300a and 300b has the downward vent hole 364.

Here, the width of the side vent hole 362 is larger than that of the downward vent hole 364, thus allowing a larger amount of gas to move from the inflator 120 to the side vent hole 362 of each of the diffusers 300a and 300b and thereby enabling the both sides 220 and 240 of the airbag cushion 200 to be first unfolded. As such, gas flows through the side vent hole 362, so that some gas flows through the downward vent hole 364 while the both sides 220 and 240 of the airbag cushion 200 are unfolded. Thereby, while the both sides 220 and 240 of the airbag cushion 200 are unfolded, the airbag cushion 200 is almost simultaneously deployed downwards, so that the speed of deploying the airbag cushion 200 can be significantly increased.

Preferably, the downward vent hole 364 is not simply directed downwards but is directed towards the center of the airbag cushion 200, thus enabling the central portion of the airbag cushion 200 to be rapidly deployed after the both sides 220 and 240 of the airbag cushion 200 are unfolded.

Such a method of deploying the airbag cushion ensures more effective deployment when the area of the airbag cushion 200 is large, and solves the existing problem wherein the deployment speed is reduced as the area of the airbag cushion is large, thus implementing an airbag cushion with improved stability and reliability.

Figure 5:
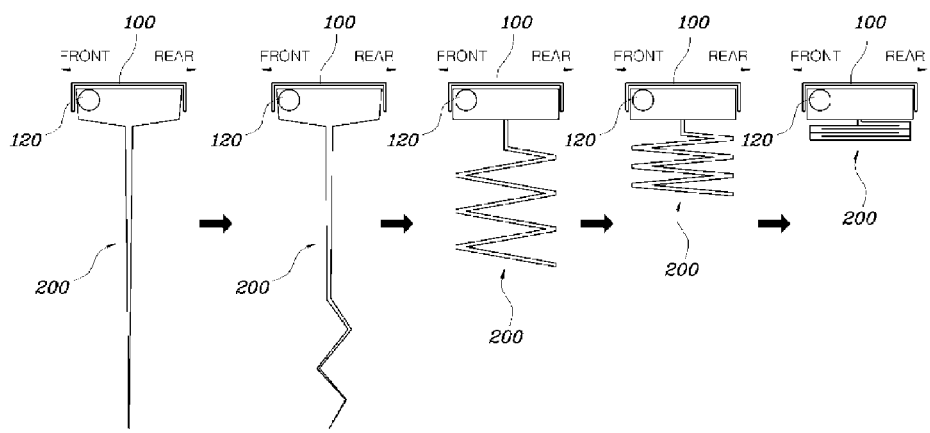
FIGS. 5 and 6 are views showing the folding of an airbag cushion in the center airbag for the vehicle according to an exemplary embodiment of the present invention.
Figure 6:
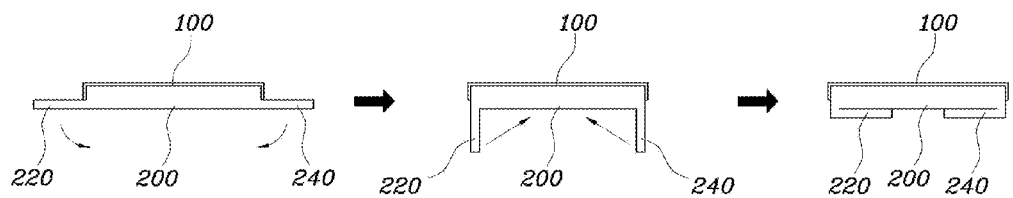

Meanwhile, as shown in FIGS. 5 and 6, the airbag cushion 200 is provided in the airbag housing by rolling the airbag cushion 200 in the state where the both sides 220 and 240 folded in a zigzag fashion in the vertical direction are folded towards the middle portion.

As such, after the airbag cushion 200 is folded several times in the zigzag manner from a lower end to an upper end thereof, the both sides are folded towards the middle portion.

Thereby, in the initial deployment stage of the airbag cushion, the both sides 220 and 240 of the airbag cushion 200 can be first unfolded by gas ejected from the inflator 120. In addition, after the both sides 220 and 240 of the airbag cushion 200 are deployed, the cushion is deployed according to its zigzag fold fashion, thus preventing the cushion from being undesirably moved forwards or rearwards, and allowing the cushion to be deployed downwards in the vertical direction. Therefore, the speed of deploying the airbag cushion can be increased, and the time required to stabilize the fully deployed airbag cushion can be reduced, thus guaranteeing a rapid action in the event of a vehicle collision.

As described above, the present invention provides a center airbag for a vehicle, in which a cushion can be rapidly deployed downwards between a front seat and a rear seat in the event of the vehicle collision, and the cushion is prevented from being caught by the back of the front seat or a passenger of the rear seat due to the deployment of the cushion towards the front seat or the rear seat, thus protecting a passenger sitting in the rear seat and preventing the dangerous throwing of baggage from the rear seat.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center airbag apparatus for a vehicle, comprising:
    an inflator ejecting gas in an event of a vehicle collision;
    an airbag housing provided on a roof panel between a front seat and a rear seat; and
    an airbag cushion coupled at an upper end thereof to the airbag housing and fluid-connected to the inflator,
        wherein the airbag cushion is folded in a vertical direction and then folded at both sides thereof towards a middle portion, thus allowing the both sides to be first unfolded and then the airbag cushion to be deployed downwards, when the gas is ejected from the inflator into the airbag cushion.

2. The center airbag apparatus as set forth in claim 1, further including:
    a diffuser provided on the upper end of the airbag cushion along with the inflator, and including at least one vent hole to allow the gas ejected from the inflator to move towards the airbag cushion.

3. The center airbag apparatus as set forth in claim 2,
    wherein the inflator includes a gas jet hole positioned at a central portion on the upper end of the airbag cushion, and
    wherein the diffuser includes on both side ends thereof vent holes, respectively, to allow the gas ejected from the inflator to move towards the both sides of the airbag cushion.

4. The center airbag apparatus as set forth in claim 2,
    wherein the inflator includes a first inflator and a second inflator, gas jet holes of the first inflator and the second inflator being disposed to be directed in opposite directions from each other, and
    wherein the diffuser includes a first diffuser and a second diffuser disposed at gas-jet-hole sides of the first inflator and the second inflator, thus allowing the gas ejected from the first inflator and the second inflator to move towards the both sides of the airbag cushion.

5. The center airbag apparatus as set forth in claim 4,
    wherein a vent hole of the first diffuser includes a side vent hole that is open to a first side of the airbag cushion, and a downward vent hole that is open towards a lower portion of the airbag cushion, and
    wherein a vent hole of the second diffuser includes a side vent hole that is open to a second side of the airbag cushion, and a downward vent hole that is open towards the lower portion of the airbag cushion.

6. The center airbag apparatus as set forth in claim 5, wherein a width of the side vent hole formed in each of the first and second diffusers is larger than a width of the downward vent hole formed in each of the first and second diffusers.

7. The center airbag apparatus as set forth in claim 1, wherein the airbag cushion is provided in the airbag housing by rolling the airbag cushion in a state where the both sides thereof folded in a zigzag fashion in the vertical direction are folded towards the middle portion.

\* \* \* \* \*